US008447302B2

(12) United States Patent
Hall et al.

(10) Patent No.: US 8,447,302 B2
(45) Date of Patent: May 21, 2013

(54) NETWORK INITIATED MOBILITY MANAGEMENT FOR MOBILE TERMINALS

(75) Inventors: Göran Hall, Molndal (SE); Jan Backman, Kärna (SE); György Miklós, Budapest (HU)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 979 days.

(21) Appl. No.: 11/739,950

(22) Filed: Apr. 25, 2007

(65) Prior Publication Data
US 2007/0253359 A1 Nov. 1, 2007

Related U.S. Application Data

(60) Provisional application No. 60/745,685, filed on Apr. 26, 2006.

(51) Int. Cl.
*H04W 88/02* (2009.01)

(52) U.S. Cl.
USPC .......................................................... 455/436

(58) Field of Classification Search ............... 455/432.1, 455/436, 438, 440; 370/338
See application file for complete search history.

(56) References Cited

U.S. PATENT DOCUMENTS

| 6,990,339 B2 | 1/2006 | Turanyi et al. | |
| 7,050,416 B2 * | 5/2006 | Bichot et al. | 370/338 |
| 2001/0034234 A1 * | 10/2001 | Palat et al. | 455/436 |
| 2002/0142771 A1 * | 10/2002 | Saifullah et al. | 455/436 |
| 2004/0013116 A1 | 1/2004 | Greis et al. | |
| 2005/0237978 A1 * | 10/2005 | Segal | 370/331 |

FOREIGN PATENT DOCUMENTS

| WO | WO 01/17291 A | 3/2001 |
| WO | WO 02/41592 A | 5/2002 |
| WO | WO 03/079636 A | 9/2003 |

OTHER PUBLICATIONS

Johnson, D. et al. Mobility Support in IPv6. The Internet Society. Network Working Group. Request for Comments: 3775. Jun. 2004.
Perkins, C. IP Mobility Support for IPv4. The Internet Society. Network Working Group. Request for Comments: 3344. Aug. 2002.
Turanyi, Z. et al. Global Internet Roaming with ROAMIP. Mobile Computing and Communications Review, vol. 1. No. 2. Jul. 2001.

(Continued)

*Primary Examiner* — Diane Mizrahi

(57) ABSTRACT

The present invention provides a system, apparatus and method wherein the network initiates a PDP context activation for a second PDP context using a new IP address that can be used for new transport sessions whenever one or more operator configured criteria apply. For example, the present invention can be used to: (1) route ongoing and new communication sessions from the old network device associated with the old IP address through a new network device associated with the new IP address using the old IP address; (2) route ongoing communication sessions from the old network device through the new network device using the old IP address, and new communication sessions directly through the new network device; or (3) route ongoing communication sessions from the old network device through the new network device without using the new IP address, and new communication sessions directly through the new network device.

32 Claims, 3 Drawing Sheets

OTHER PUBLICATIONS

3GPP. $3^{rd}$ Generation Partnership Project; Technical Specification Group Services and System Aspects: 3GPP System Architecture Evolution; Report on Technical Options and Conclusions (Release 7). 3GPP TR 23.882 V1.0.0 (Mar. 2006).

Wasserman, M et al. Recommendations for IPv6 in Third Generation Partnership Project (3GPP) Standards. RFC 3314. Sep. 1, 2002.

Vodafone UK. Discussion on Security Issues with Multiple Primary PDP Contexts. 3GPP Draft; S2-031369. $3^{rd}$ Generation Partnership Project (3GPP). Apr. 12, 2003.

Solomon, J.D. Mobile IP. The Internet Unplugged. Prentice Hall. Jan. 1, 1998.

* cited by examiner

NETWORK INITIATED MOBILITY MANAGEMENT FOR MOBILE TERMINALS

PRIORITY CLAIM

This patent application is a non-provisional application of U.S. provisional patent application 60/745,685 filed on Apr. 26, 2006 and entitled "Network Initiated Activation for Local Breakout/Initiation of a New Primary PDP Context Due to Mobility," which is hereby incorporated by reference in its entirety.

TECHNICAL FIELD

The present invention relates in general to the field of mobile communications and more particularly, to network initiated mobility management for mobile terminals.

BACKGROUND

When using mobile packet switched services there is in some cases a need to use an Internet Protocol (IP) point of presence (POP) that is, in the network topology, located closer to the physical location of the user equipment. This need may arise due to several reasons.

One such reason could be to avoid suboptimal routing that would occur if the user equipment (UE) (also referred to as a mobile terminal) keeps its IP point of presence and uses the same IP address to communicate, while it moves far away from the IP point of presence. This may cause inefficiencies depending on what kind of services the UE is using. The inefficiencies could arise in the form of too long delays, too low throughput (e.g., due to the long delay when Transport Control Protocol (TCP) is used as the transport protocol). Additionally, the suboptimal routing can cause unnecessary transmission costs for the operator.

Another reason for the need of a local IP point of presence is to use localized content, where the localization could be based on the IP address. Another example of this is local multicast services.

In addition, IP mobility solutions, namely Mobile IP (RFC 3344, IP Mobility Support for IPv4; RFC3775, Mobility Support in IPv6), may require a local IP address to work in the mobile system. Note that Mobile IP based solutions are being discussed for the new System Architecture Evolution (SAE) system architecture (3GPP TR 23.882, System Architecture Evolution Report on Technical Options and Conclusions), though there is no conclusion yet if they will eventually be used.

In the current General Packet Radio Service (GPRS), mobile terminals can request a new IP address using the packet data protocol (PDP) context activation procedure. This procedure is initiated by the terminal, and it is typically invoked when the terminal expects to use packet switched services. There is no mechanism in GPRS where terminal mobility would trigger the activation of a new PDP context. Also, there is no easily deployable mechanism for a network-initiated IP address allocation. In other words, there is no network-initiated PDP context activation procedure. For these reasons, current GPRS technology does not provide the means to satisfy the need for a local IP point of presence.

Note that one exception exists: when the mobile terminal roams to a new network, it may perform a new attach and subsequently a new PDP context activation procedure which can allocate a local IP point of presence (i.e., local IP address) in the visited network. This typically occurs when the mobile terminal moves to a new network operator. But according to the discussion above, there is also a need to allocate a local IP point of presence, which is initiated by the network, even when the mobile terminal remains in the same network. This need is especially high in networks that span over a large geographical area, e.g. USA or China.

Although Mobile Internet Protocol version 6 (MIPv6) route optimization could be used to solve the routing optimization problems, it has a number of disadvantages. First, the policy enforcement point is changed in an ongoing flow which may compromise charging and policy control enforcement. Second, policy and charging enforcement becomes more complicated because the network has to process more headers, i.e. those associated with Mobile IP. Third, moving the enforcement point could also require that the Policy Control and Charging Rules Function (PCRF) node is moved which introduces a lot of complexity, namely the transfer of context from the old to the new PCRF, and selection of the current PCRF becomes difficult.

Also note that MIPv6 would require that the terminal implements the corresponding MIPv6 protocol mechanisms which are assumed to be complex. Additionally, the correspondent nodes are also required to support MIPv6 route optimization. That means that the MIPv6 approach works only for IPv6 compatible networks.

SUMMARY

The present invention provides a system, apparatus and method wherein the network initiates a PDP context activation for a second PDP context using a new IP address that can be used for new transport sessions whenever one or more operator configured criteria apply. For example, the present invention can be used to: (1) route ongoing and new communication sessions from the old network device associated with the old IP address through a new network device associated with the new IP address using the old IP address; (2) route ongoing communication sessions from the old network device through the new network device using the old IP address, and new communication sessions directly through the new network device; or (3) route ongoing communication sessions from the old network device through the new network device without using the new IP address, and new communication sessions directly through the new network device. Alternatively, the UE can initiate the second Primary PDP context set up based on (specific) location information received in the broadcast information received from the base stations or initiated from a PDN GW/Serv. GW.

Accordingly, the present invention allows the Third Partnership Project (3GPP) core network to take control over the Gateway GPRS Support Node/Packet Data Network Gateway (GGSN/PDN GW) handover process to provide smooth handovers in the network for local breakout. By using network initiated PDP context activation for the second PDP context with a new IP address, small impact is foreseen in the User Equipment (UE) or mobile terminal, and no tunneling support is needed in the UE. The impact on the Policy Control and Charging (PCC) architecture is also minimal. Moreover, there will not be any impact on procedures when local breakout is not supported. This new PDP context with a new IP address can then be used for local breakout of IP-traffic. Alternatively, this PDP context can also be used for IP-based mobility protocols such as Mobile IP (with or without route optimization), MIPv4, MIPv6, or Roam-IP.

A first embodiment of the present invention provides a method for creating a second network address for a mobile terminal having a first network address within a communications network. The second network address for the mobile terminal is created whenever one or more network operator criteria are satisfied. Thereafter, the second network address is provided to the mobile terminal and one or more network devices such that the second network address is used for one or more new communication sessions with the mobile terminal.

A second embodiment of the present invention provides a method for creating a second network address for a mobile terminal having a first network address within a communications network. The network determines whether one or more network operator criteria associated with a mobile terminal have been satisfied. If the network operator criteria have been satisfied, the second network address for the mobile terminal is created, one or more use-based parameters are defined for the first and second network addresses, the second network address is registered with a network database, the second network address is provided to the mobile terminal and one or more applicable network devices and correspondent nodes, and the first and second network addresses are used and removed in accordance with the defined use-based parameters.

A third embodiment of the present invention provides a network node for creating a second network address for a mobile terminal having a first network address within a communications network. The network node includes a communications interface communicably coupled to the mobile terminal and one or more network devices and a processor communicably coupled to the communications interface. The processor is configured to create the second network address for the mobile terminal whenever one or more network operator criteria are satisfied and provide the second network address to the mobile terminal and one or more network devices via the communications interface such that the second network address is used for one or more new communication sessions with the mobile terminal.

A fourth embodiment of the present invention provides a system having a communications network and a mobile termination. The communications network has at least one network node and one or more network devices. The mobile terminal is communicably coupled to the network node and has a first network address. The network node has a processor configured to create a second network address for the mobile terminal whenever one or more network operator criteria are satisfied and provide the second network address to the mobile terminal and at least one of the network devices such that the second network address is used for one or more new communication sessions with the mobile terminal.

BRIEF DESCRIPTION OF THE SEVERAL VIEWS OF THE DRAWINGS

Further benefits and advantages of the present invention will become more apparent from the following description of various embodiments that are given by way of example with reference to the accompanying drawings, in which.

DETAILED DESCRIPTION

Figure 1:
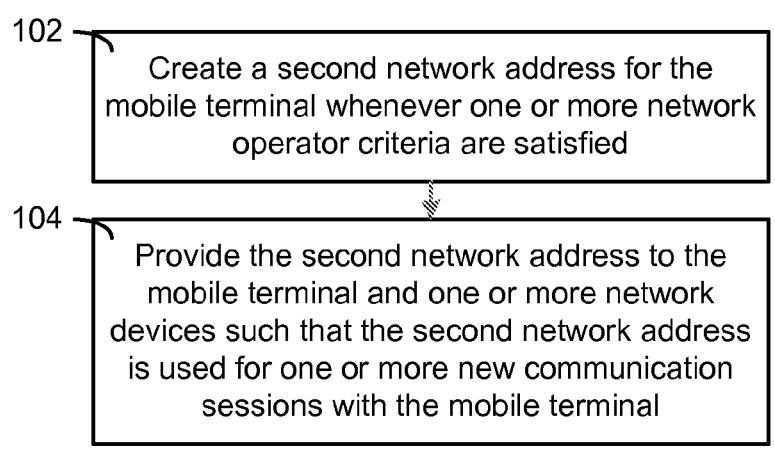
FIG. 1 is a flow chart illustrating a method for creating a second network address for a mobile terminal having a first network address within a communications network in accordance with a first embodiment of the present invention.

While the making and using of various embodiments of the present invention are discussed in detail below, it should be appreciated that the present invention provides many applicable inventive concepts that can be embodied in a wide variety of specific contexts. The specific embodiments discussed herein are merely illustrative of specific ways to make and use the invention and are not intended to limit the scope of the invention.

To facilitate the understanding of this invention, a number of terms are defined below. Terms defined herein have meanings as commonly understood by a person of ordinary skill in the areas relevant to the present invention. Terms such as "a", "an" and "the" are not intended to refer to only a singular entity, but include the general class of which a specific example may be used for illustration. The terminology herein is used to describe specific embodiments of the invention, but their usage does not delimit the invention, except as outlined in the claims.

The present invention provides a system, apparatus and method wherein the network initiates a PDP context activation for a second PDP context using a new IP address that can be used for new transport sessions whenever one or more operator configured criteria apply. For example, the present invention can be used to: (1) route ongoing and new communication sessions from the old network device associated with the old IP address through a new network device associated with the new IP address using the old IP address; (2) route ongoing communication sessions from the old network device through the new network device using the old IP address, and new communication sessions directly through the new network device; or (3) route ongoing communication sessions from the old network device through the new network device without using the new IP address, and new communication sessions directly through the new network device. Alternatively, the UE can initiate the second Primary PDP context set up based on (specific) location information received in the broadcast information received from the base stations or initiated from a PDN GW/Serv. GW.

Accordingly, the present invention allows the Third Partnership Project (3GPP) core network to take control over the Gateway GPRS Support Node/Packet Data Network Gateway (GGSN/PDN GW) handover process to provide smooth handovers in the network for local breakout. By using network initiated PDP context activation for the second PDP context with a new IP address, small impact is foreseen in the User Equipment (UE) or mobile terminal, and no tunneling support is needed in the UE. The impact on the Policy Control and Charging (PCC) architecture is also minimal. Moreover, there will not be any impact on procedures when local breakout is not supported.

This new PDP context with a new IP address can then be used for local breakout of IP-traffic. Alternatively, this PDP context can also be used for IP-based mobility protocols such as Mobile IP (with or without route optimization, MIPv4 (see RFC 3344, IP Mobility Support for IPv4) or MIPv6 (see RFC3775, Mobility Support in IPv6) or Roam-IP (see Z. R. Turányi, Cs. Szabó, E. Kail, A. G. Valkó, "Global Internet Roaming with ROAMIP," ACM Mobile Computing and Communications Review (MCCR), Vol. 4, No. 3, p. 58-68, July 2001; Zoltán Turányi, András G. Valkó "Roaming agent for internetwork handover", invention disclosure, ETH/RL-99:1441; Zoltán Turányi, András G. Valkó "Mobility Management for Mobile terminals", U.S. Pat. No. 6,990,339 B2, Jan. 24, 2006). Roam-IP is a global mobility architecture that uses application layer solutions for global reachability and reuses transparent tunneling mechanisms to ensure session continuity. The present invention and Roam-IP on application layer solutions for reachability. As discussed in the references cited above, most applications have their own registration mechanisms which eliminate the need to provide reachability at a permanent IP address (which is a feature of Mobile IP). While Roam-IP provides solutions for how to maintain session continuity even when the user hands over from one network to another, it does not consider how a local IP point of presence can be provided in a mobile network spanning a large coverage area. Hence, the present invention can be regarded as being complementary to Roam-IP such that a network operator may use both the present invention and Roam-IP, or any one of them.

Now referring to FIG. 1, a flow chart illustrating a method 100 for creating a second network address for a mobile terminal having a first network address within a communications network in accordance with a first embodiment of the present invention is shown. The second network address for the mobile terminal is created whenever one or more network operator criteria are satisfied in block 102. The first and second network addresses can be an Internet Protocol (IP) point of presence, identifier or combination of data that can be used to properly route traffic to the mobile terminal. The mobile terminal, also referred to as user equipment (UE), can be a phone, personal data assistant (PDA), computer or other mobile communications device. The one or more network operator criteria may include a movement of the mobile terminal within a home public land mobile network (PLMN) or to a new visited PLMN, a traffic type associated with the first network address, a traffic quality associated with the first network address, a traffic quantity associated with the first network address, a determination that the first network address is not local enough for the one or more new communication sessions or a combination thereof. The second network address can be created by initiating a packet data protocol (PDP) context activation by a network node or the mobile terminal. The mobile station initiates the PDP context activation after receiving a specific location information in a broadcast from a base station or initiated from a PDN GW/Serv. GW. In other words, the network instructs the mobile terminal to initiate the PDP context activation. Thereafter, the second network address is provided to the mobile terminal and one or more network devices such that the second network address is used for one or more new communication sessions with the mobile terminal in block 104. The one or more network devices may include a database, a correspondent node, a Gateway General Packet Radio Service Support Node (GGSN) or a PDN GW/Serv, GW.

The use of the second network address and continued use of the first network address can fixed or dynamically determined by the network operator. In other words, the network operator is free to configure the present invention to determine how and when both ongoing and new communication sessions should be routed to the mobile terminal via the first network address, the second network address or a combination thereof. For example, the first network address can be mandatory for one or more ongoing communication sessions, optional for the one or more ongoing communication sessions, or used only for one or more specific applications. Similarly, the second network address can be mandatory for the one or more new communication sessions, optional for the one or more new communication sessions, or used only for one or more specific applications. The second network address can also be used for tunneling traffic from the first network address, a network node (e.g., a Gateway General Packet Radio Service Support Node (GGSN) or a Packet Data Network Gateway/Serving Gateway (PDN GW/Serv. GW)), or an anchor point to the second network address. Typically, the first network address will be removed after a specified period of time, a traffic threshold is reached or a combination thereof. Likewise, the second network address will be typically maintained as long as the mobile terminal is connected to the communications network, until the mobile terminal moves to a new communications network or until a specified period of time has elapsed. As previously discussed, the second network address can be used for a local breakout of Internet Protocol (IP) traffic or with one or more IP-based mobility protocols (e.g., Mobile IP with route optimization, Mobile IP without route optimization, MIPv4, MIPv6, Roam IP or a combination thereof).

Figure 2:
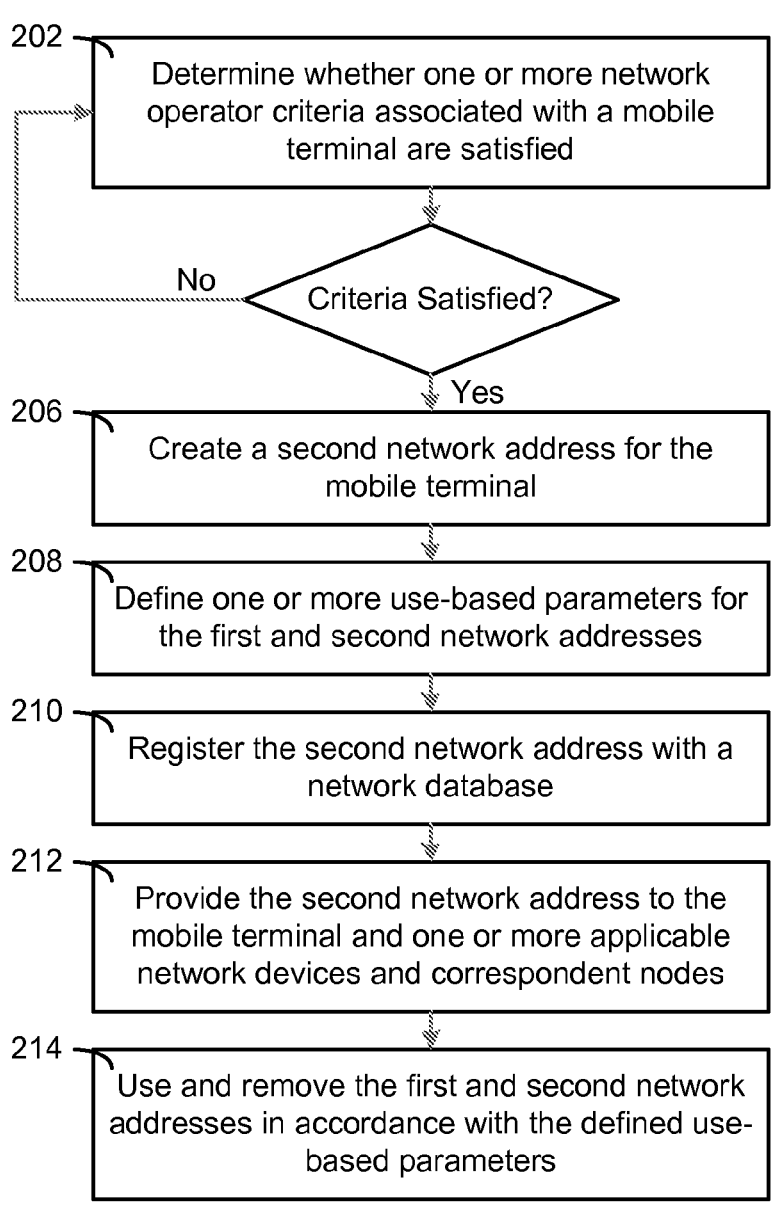
FIG. 2 is a flow chart illustrating a method for creating a second network address for a mobile terminal having a first network address within a communications network in accordance with a second embodiment of the present invention.

Referring now to FIG. 2, a flow chart illustrating a method 200 for creating a second network address for a mobile terminal having a first network address within a communications network in accordance with a second embodiment of the present invention is shown. The network determines whether one or more network operator criteria associated with the mobile terminal have been satisfied in block 202. If the one or more criteria have not been satisfied, as determined in decision block 204, the network continues to monitor the mobile terminal in block 202. If the one or more operator criteria associated with the mobile terminal have been satisfied, as determined in decision block 204, the second network address is created for the mobile terminal in block 206 and one or more use-based parameters are defined for the first and second network addresses in block 208.

The use-based parameters define how and when the first and second network addresses with be used with ongoing and new communication sessions, and when they will be removed. The application of the use-based parameters can be fixed or dynamically determined by the network operator. For example, the first network address can be mandatory for one or more ongoing communication sessions, optional for the one or more ongoing communication sessions, or used only for one or more specific applications. Similarly, the second network address can be mandatory for the one or more new communication sessions, optional for the one or more new communication sessions, or used only for one or more specific applications. The second network address can also be used for tunneling traffic from the first network address, a network node, or an anchor point to the second network address. Typically, the first network address will be removed after a specified period of time, a traffic threshold is reached or a combination thereof. Likewise, the second network address will be typically maintained as long as the mobile terminal is connected to the communications network, until the mobile terminal moves to a new communications network or until a specified period of time has elapsed. The second network address is registered with a network database in block 210 and provided to the mobile terminal and one or more applicable network devices and correspondent nodes in block 212. Thereafter, the first and second network addresses are used and removed in accordance with the defined use-based parameters in block 214.

The third and fourth embodiments of the present invention will now be described in reference to the examples shown in FIGS. 3A, 3B and 3C. The present invention provides support in the 3GPP core network for local breakout solutions by initiating a PDP context activation procedure for a local IP point of presence. Basically the same mechanisms can be used both within a home PLMN and in the roaming case when the user moves to a new visited PLMN. Currently a tunneling mechanism is in place which tunnels traffic to and from the existing IP point of presence where the existing IP address is allocated. In many cases, the trigger for the activation of the new PDP context is the mobility of the user, which may be both mobility within the same PLMN, or roaming to a new PLMN The selection of "home PDN GW" (or GGSN, since this can be applied on 2G and 3G GPRS also) is decided by the local Serving GPRS Support node (SGSN)/MME and the domain name service (DNS) configuration for access point names (APN). Note that the new SAE system may use new mechanisms for the selection of a PDN GW/Serv. GW node in the MME, other than the current DNS lookup mechanism. The APN name needs to be available at the new SGSN (either retrieved from the SGSN context response (for legacy it is hidden in the PDP context, for new messages this info must be available), or alternatively from the UE) in order to support the present invention with handovers between operators (handovers between operators are rarely or maybe never used today). If the APN name is available, then the local GGSN/PDN GW or SGSN/MME can decide whether new PDP contexts shall be allocated locally or traffic shall be tunneled to the old GGSN/PDN GW. It is not required to support this between PLMNs but by using the same tunneling solution between PLMNs and within PLMNs it is possible to support that scenario also.

The network initiates a PDP context activation of another PDP context with a new IP address (using the standard network requested PDP context activation procedure, in 3GPP 23.0606, or an evolution thereof), when the old GGSN or PDN GW is not considered to be local enough for the traffic. This is defined by operator configured criteria. The MME/SGSN may or may not change as a result of the change in the PDN GW/Serv. GW/GGSN. The new PDP context may be used for new transport sessions, i.e. all new connections to different applications, p-2-c or p-2-p based. The new IP address may also be used for tunneling of traffic from another node, such as the previous GGSN or PDN GW/Serv. GW, or from any anchor point. For the latter, the tunneling protocol/solution may be Mobile IPv4, Mobile IPv6 or any other mobility protocol using the new IP address as tunnel endpoint.

The system includes a communications network 300 and a mobile terminal 302. The communications network 300 has at least one region (e.g., Region A and Region B), at least one network node (e.g., PDN GW/Serv. GW home address 304, PDN GW/Serv. GW foreign address 306 or other network node) and one or more network devices (not shown). The mobile terminal 302 is communicably coupled to the network node 304 and has a first network address 308. The applicable network node has a processor configured to create a second network address 310 for the mobile terminal 300 whenever one or more network operator criteria are satisfied and provide the second network address 310 to the mobile terminal 302 and at least one of the network devices (e.g., PDN GW/Serv. GW home address 304, correspondent node 312 or other device) such that the second network address 310 is used for one or more new communication sessions with the mobile terminal 302. The network node also includes a communications interface communicably coupled to the mobile terminal 302 and one or more network devices.

Figure 3A:
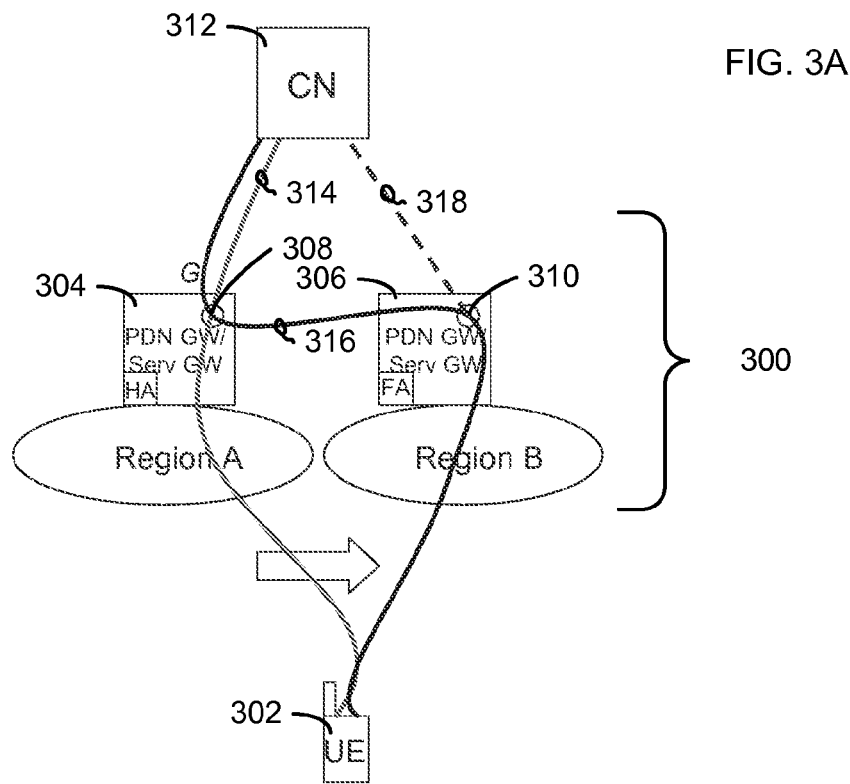
FIGS. 3A, 3B and 3C show a system and network nodes operating in accordance with various embodiments of the present invention.

Now referring to FIG. 3A, a tunneling protocol/solution for Mobile IPv4 using the present invention is shown. The ongoing communication session (path 314) prior to initiation of the second network address 310 is between the mobile terminal 302, the home PDN GW/Serv. GW 304 and the correspondent node 312. After creation of the second network address 310, the ongoing communication session and any new communication sessions (path 316) are routed from the home PDN GW/Serv. GW 304 and through the foreign PDN GW/Serv. GW 306 (care-of address) using the second network address 310. Triangular routing 318 is possible with MIPv4, but it optimizes the uplink only and makes firewall configuration and policy enforcement very difficult.

Figure 3B:
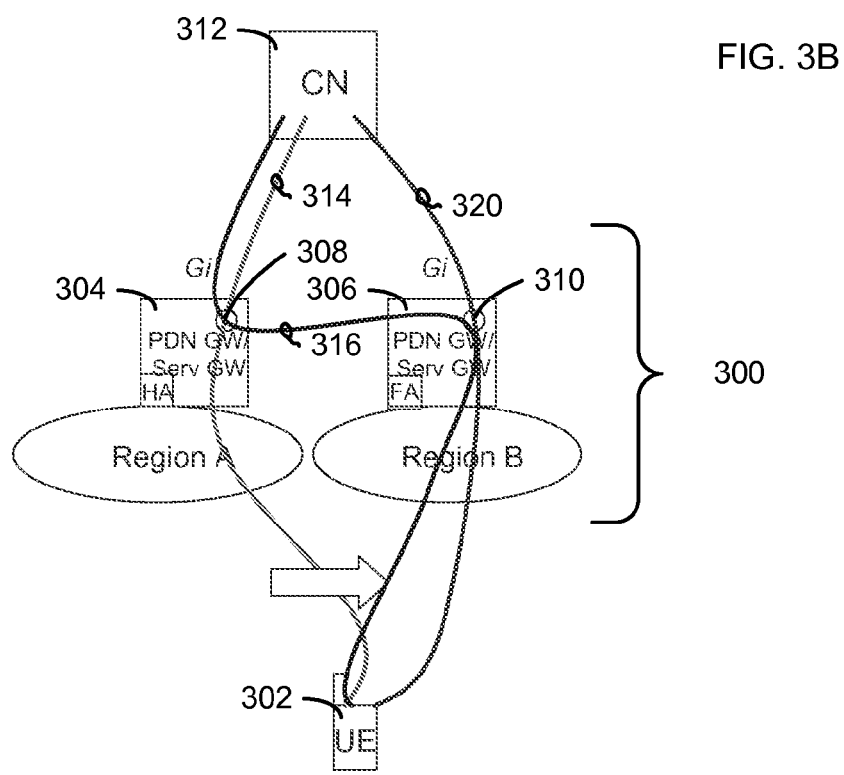

Referring to FIG. 3B, a tunneling protocol/solution for Mobile IPv6 using the present invention is shown. The ongoing communication session (path 314) prior to initiation of the second network address 310 is between the mobile terminal 302, the home PDN GW/Serv. GW 304 and the correspondent node 312. After creation of the second network address 310, the ongoing communication session is routed from the home PDN GW/Serv. GW 304 and through the foreign PDN GW/Serv. GW 306 (care-of address) using the second network address 310 (path 316), and any new communication sessions (path 320) are optimally routed by MIPv6 directly through the foreign PDN GW/Serv. GW 306 (care-of address) using the second network address 310.

Figure 3C:
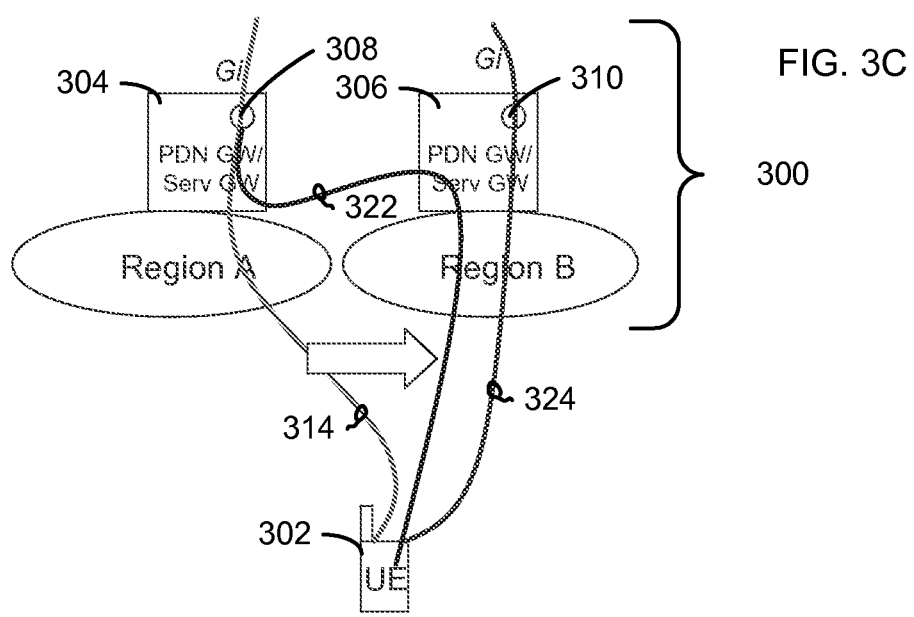

Now referring to FIG. 3C, a protocol/solution without tunneling using the present invention is shown. The ongoing communication session (path 314) prior to initiation of the second network address 310 is between the mobile terminal 302, the home PDN GW/Serv. GW 304 and the correspondent node 312. After creation of the second network address 310, the ongoing communication session is routed from the home PDN GW/Serv. GW 304 through the foreign PDN GW/Serv. GW 306 (care-of address) without using the second network address 310 (path 322), and any new communication sessions (path 324) are routed directly through the foreign PDN GW/Serv. GW 306 (care-of address) using the second network address 310. In this case, there is no tunneling to the new IP address 310; instead, the Gn/Gp interface between SGSN and GGSN (alternatively that the inter PDN GW/Serv. GW interface in SAE/LTE) is used for traffic to/from the old IP address 308 for already ongoing communications. For new sessions the UE 302 shall use the new IP address 310 allocated from the new GGSN or PDN GW. This can be achieved e.g., by having different routing costs or by having explicit support for this mechanism in the UE 302 TCP/IP stack. The network can then include mechanism, either timer based or traffic measurement based, that eventually removes the old IP address 308 through the GGSN initiated delete of PDP context (or evolved version thereof). The new IP address 310 in the new GGSN or PDN GW for SAE is kept as long as the UE 302 is still connected to the network, or until the UE 302 moves to the next location where a Local Breakout (LBO) is needed.

The network may provide additional information on how the new address should be used, i.e., whether to use it for all applications or only specific ones, whether it is mandatory or optional to use it, whether Mobile IP can be used with the address (without or with route optimization) whether the other addresses will be deleted, and so on. Note that it is possible that some of the traffic is using the local IP address while the rest of the traffic is using the IP address from the original IP point of presence. e.g., in the roaming scenario it may be possible that the home operator allows only some of the traffic to be local (e.g., only emergency traffic or only internet traffic is allowed to be broken out locally).

Alternatively, the UE can initiate the second Primary PDP context activation based on (specific) location information received in the broadcast information received from the base stations or initiated from a PDN GW/Serv. GW. The location information is either based on the Routing/tracking area (or similar, e.g., using some bits of the routing/tracking area identifier) but then the UE needs to know at which RA change the new primary PDP context shall be set up. The more realistic approach seems to be that an additional information is added to the broadcast message with some identity of the regions where a local GGSN/PDN GW close to the base station can be selected.

The mobile terminal can take advantage of the new IP address in several ways. When an IP application starts a new transport session, it asks for a new socket connection from the operating system of the terminal. The operating system assigns an IP address for the socket connection. Thereby the operating system has control over which IP address is being used by new connections. Whenever a new, local IP address is assigned to the terminal, new connections can start using this new address.

Additionally, applications can be directly informed about the existence of the new local IP address. In many applications, there is a registration process where the IP address can be registered in a server together with an application-level id. The allocation of a new IP address can trigger such a registration process, making user that the application will start using the new IP address.

Although the change of the IP address could in theory be problematic for applications in some rare cases, most applications can handle the loss of connectivity at an old IP address and automatically re-establish connectivity at a new IP address. Note that this is needed not only for local breakout, but also to handle cases when network connectivity may go up and down. Furthermore, many network operators, e.g. broadband operators do not allow users to keep the same IP address for extended periods of time (e.g., more than a day), which is another reason why applications already today need to prepare for a change of the IP address.

Although the present invention and its advantages have been described in detail, it should be understood that various changes, substitutions and alterations can be made herein without departing from the scope of the invention as defined by the appended claims. Moreover, the scope of the present application is not intended to be limited to the particular embodiments of the process, machine, manufacture, composition of matter, means, methods and steps described in the specification, but only by the claims.

What is claimed:

1. A method for creating a second network Internet Protocol (IP) address for a mobile terminal having a first network IP address within a communications network, the method comprising the steps of:
    creating the second network IP address for the mobile terminal whenever one or more network operator criteria are satisfied, where the one or more network operator criteria comprises a movement of the mobile terminal within a home public land mobile network (PLMN), and where the mobile terminal has both the first network IP address and the second network IP address while within the home PLMN;
    providing the second network address to the mobile terminal and one or more network devices such that the second network address is used for one or more new communication sessions with the mobile terminal; and
    determining how and when both one or more ongoing sessions and the one or more new communication sessions with the mobile terminal will be routed to the mobile terminal via the first network IP address, the second network IP address, or a combination thereof.

2. The method of claim 1, wherein the first and second network IP addresses each comprise an Internet Protocol (IP) point of presence.

3. The method of claim 1, wherein the one or more network operator criteria comprises a movement of the mobile terminal to a new visited PLMN, a traffic type associated with the first network IP address, a traffic quality associated with the first network IP address, a traffic quantity associated with the first network IP address, the first network IP address is not local enough for the one or more new communication sessions or a combination thereof.

4. The method of claim 1, wherein the one or more network devices comprise a database, a correspondent node, a Gateway General Packet Radio Service Support Node (GGSN) or a Packet Data Network Gateway/Serving Gateway (PDN GW/Serv. GW).

5. The method of claim 1, wherein the second network IP address is created by initiating a packet data protocol (PDP) context activation by a network node or the mobile terminal.

6. The method of claim 5, wherein the mobile station initiates the PDP context activation after receiving a specific location information in a broadcast from a base station or initiated from a Packet Data Network Gateway/Serving Gateway (PDN GW/Serv. GW).

7. The method of claim 1, wherein:
    the first network IP address is mandatory for one or more ongoing communication sessions, optional for the one or more ongoing communication sessions, or used only for one or more specific applications; and
    the second network IP address is mandatory for the one or more new communication sessions, optional for the one or more new communication sessions, or used only for one or more specific applications.

8. The method of claim 1, further comprising the step of removing the first network IP address after a specified period of time, a traffic threshold is reached or a combination thereof.

9. The method of claim 1, wherein the second network IP address is used for a local breakout of Internet Protocol (IP) traffic or one or more IP-based mobility protocols.

10. The method of claim 9, wherein the one or more IP-based mobility protocols comprise Mobile IP with route optimization, Mobile IP without route optimization, Mobile IP version 4 (MIPv4), Mobile IP version 6 (MIPv6), Roam IP or a combination thereof.

11. The method of claim 1, further comprising the step of determining whether one of the new communication sessions should be routed to the first network IP address, the second network IP address or a combination thereof.

12. The method of claim 1, further comprising the steps of:
    routing one or more ongoing communication sessions and the one or more new communication sessions from a first network device associated with the first network IP address through a second network device associated with the second network IP address using the first network IP address; or
    routing the one or more ongoing communication sessions from the first network device through the second network device using the first network IP address, and routing the one or more new communication sessions directly through the second network device; or
    routing the one or more ongoing communication sessions from the first network device through the second network device without using the second network IP address, and routing the one or more new communication sessions directly through the second network device.

13. The method of claim 12, wherein the network node comprises a Gateway General Packet Radio Service Support Node (GGSN) or a Packet Data Network Gateway/Serving Gateway (PDN GW/Serv. GW).

14. The method of claim 1, wherein the second network IP address is maintained as long as the mobile terminal is connected to the communications network, until the mobile terminal moves to a new communications network or until a specified period of time has elapsed.

15. The method of claim 1, further comprising the steps of:
registering the second network IP address with a network database; and
informing a correspondent node of the second network IP address.

16. A network node for creating a second Internet Protocol (IP) network address for a mobile terminal having a first network IP address within a communications network, the network node comprising:
a communications interface communicably coupled to the mobile terminal and one or more network devices;
a processor communicably coupled to the communications interface wherein the processor is configured to create the second network IP address for the mobile terminal whenever one or more network operator criteria are satisfied, where the one or more network operator criteria comprises a movement of the mobile terminal within a home public land mobile network (PLMN), and where the mobile terminal has both the first network IP address and the second network IP address while within the home PLMN, provide the second network IP address to the mobile terminal and one or more network devices via the communications interface such that the second network IP address is used for one or more new communication sessions with the mobile terminal, and determine how and when both one or more ongoing sessions and the one or more new communication sessions with the mobile terminal will be routed to the mobile terminal via the first network IP address, the second network IP address, or a combination thereof.

17. The network node of claim 16, wherein the one or more network operator criteria comprises a movement of the mobile terminal to a new visited PLMN, a traffic type associated with the first network IP address, a traffic quality associated with the first network IP address, a traffic quantity associated with the first network IP address, the first network IP address is not local enough for the one or more new communication sessions or a combination thereof.

18. The network node of claim 16, wherein the second network IP address is created by initiating a packet data protocol (PDP) context activation by the network node or the mobile terminal.

19. The network node of claim 18, wherein the mobile station initiates the PDP context activation after receiving a specific location information in a broadcast from a base station or initiated from a Packet Data Network Gateway/Serving Gateway (PDN GW/Serv. GW).

20. The network node of claim 16, wherein:
the first network IP address is mandatory for one or more ongoing communication sessions, optional for the one or more ongoing communication sessions, or used only for one or more specific applications; and
the second network IP address is mandatory for the one or more new communication sessions, optional for the one or more new communication sessions, or used only for one or more specific applications.

21. The network node of claim 16, wherein the second network IP address is used for a local breakout of Internet Protocol (IP) traffic or one or more IP-based mobility protocols.

22. The network node of claim 16, wherein:
one or more ongoing communication sessions and the one or more new communication sessions are routed from a first network device associated with the first network IP address through a second network device associated with the second network IP address using the first network IP address; or
the one or more ongoing communication sessions are routed from the first network device through the second network device using the first network IP address, and the one or more new communication sessions are routed directly through the second network device; or
the one or more ongoing communication sessions are routed from the first network device through the second network device without using the second network IP address, and the one or more new communication sessions are routed directly through the second network device.

23. A system comprising:
a communications network having at least one network node and one or more network devices;
a mobile terminal communicably coupled to the network node and having a first network Internet Protocol (IP) address; and
the network node having a processor configured to create a second network IP address for the mobile terminal whenever one or more network operator criteria are satisfied, where the one or more network operator criteria comprises a movement of the mobile terminal within a home public land mobile network (PLMN), and where the mobile terminal has both the first network IP address and the second network IP address while within the home PLMN, provide the second network IP address to the mobile terminal and at least one of network devices such that the second network IP address is used for one or more new communication sessions with the mobile terminal, and determine how and when both one or more ongoing sessions and the one or more new communication sessions with the mobile terminal will be routed to the mobile terminal via the first network IP address, the second network IP address, or a combination thereof.

24. The system of claim 23, wherein the one or more network operator criteria comprises a movement of the mobile terminal to a new visited PLMN, a traffic type associated with the first network IP address, a traffic quality associated with the first network IP address, a traffic quantity associated with the first network IP address, the first network IP address is not local enough for the one or more new communication sessions or a combination thereof.

25. The system of claim 23, wherein the second network IP address is created by initiating a packet data protocol (PDP) context activation by the network node or the mobile terminal.

26. The system of claim 25, wherein the mobile station initiates the PDP context activation after receiving a specific location information in a broadcast from a base station or initiated from a Packet Data Network Gateway/Serving Gateway (PDN GW/Serv. GW).

27. The system of claim 23, wherein:
the first network IP address is mandatory for one or more ongoing communication sessions, optional for the one or more ongoing communication sessions, or used only for one or more specific applications; and
the second network IP address is mandatory for the one or more new communication sessions, optional for the one or more new communication sessions, or used only for one or more specific applications.

28. The system of claim 23, wherein the second network IP address is used for a local breakout of Internet Protocol (IP) traffic or one or more IP-based mobility protocols.

29. The system of claim 23, wherein:
one or more ongoing communication sessions and the one or more new communication sessions are routed from a first network device associated with the first network IP address through a second network device associated with the second network IP address using the first network IP address; or
the one or more ongoing communication sessions are routed from the first network device through the second network device using the first network IP address, and the one or more new communication sessions are routed directly through the second network device; or
the one or more ongoing communication sessions are routed from the first network device through the second network device without using the second network IP address, and the one or more new communication sessions are routed directly through the second network device.

30. A method for creating a second network Internet Protocol (IP) address for a mobile terminal having a first network IP address within a communications network, the method comprising the steps of:
determining whether one or more network operator criteria associated with a mobile terminal have been satisfied, where the one or more network operator criteria comprises a movement of the mobile terminal within a home public land mobile network (PLMN), and where the mobile terminal has both the first network IP address and the second network IP address while within the home PLMN; and
creating the second network IP address for the mobile terminal, defining one or more use-based parameters for the first and second network IP addresses, registering the second network IP address with a network database, providing the second network IP address to the mobile terminal and one or more applicable network devices and correspondent nodes, using and removing the first and second network IP addresses in accordance with the defined use-based parameters whenever one or more network operator criteria are satisfied, and determining how and when both one or more ongoing sessions and one or more new communication sessions with the mobile terminal will be routed to the mobile terminal via the first network IP address, the second network IP address, or a combination thereof.

31. A method for creating a second network Internet Protocol (IP) address for a mobile terminal having a first network IP address within a communications network, the method comprising the steps of:
creating the second network IP address for the mobile terminal whenever one or more network operator criteria are satisfied, where the one or more network operator criteria comprises a movement of the mobile terminal within a home public land mobile network (PLMN), and where the mobile terminal has both the first network IP address and the second network IP address while within the home PLMN;
providing the second network address to the mobile terminal and one or more network devices such that the second network address is used for one or more new communication sessions with the mobile terminal;
determining how and when both one or more ongoing sessions and the one or more new communication sessions with the mobile terminal will be routed to the mobile terminal via the first network IP address, the second network IP address, or a combination thereof; and
removing the first network IP address after a specified period of time, a traffic threshold is reached or a combination thereof.

32. A network node for creating, a second Internet Protocol (IP) network address for a mobile terminal having a first network IP address within a communications network, the network node comprising:
a communications interface communicably coupled to the mobile terminal and one or more network devices;
a processor communicably coupled to the communications interface wherein the processor is configured to create the second network IP address for the mobile terminal whenever one or more network operator criteria are satisfied, where the one or more network operator criteria comprises a movement of the mobile terminal within a home public land mobile network (PLMN), and where the mobile terminal has both the first network IP address and the second network IP address while within the home PLMN, provide the second network IP address to the mobile terminal and one or more network devices via the communications interface such that the second network IP address is used for one or more new communication sessions with the mobile terminal, and determine how and when both one or more ongoing sessions and the one or more new communication sessions with the mobile terminal will be routed to the mobile terminal via the first network IP address, the second network IP address, or a combination thereof;
wherein the second network IP address is created by initiating a packet data protocol (PDP) context activation by a network node or the mobile terminal; and
wherein the mobile station initiates the PDP context activation after receiving a specific location information in a broadcast from a base station or initiated from a Packet Data Network Gateway/Serving Gateway (PDN GW/Serv. GW).

* * * * *